March 21, 1961 S. LEES 2,975,641
INTEGRATING ACCELEROMETER WITH VISCOUS DRAG PUMP
Filed Dec. 15, 1958 2 Sheets-Sheet 1
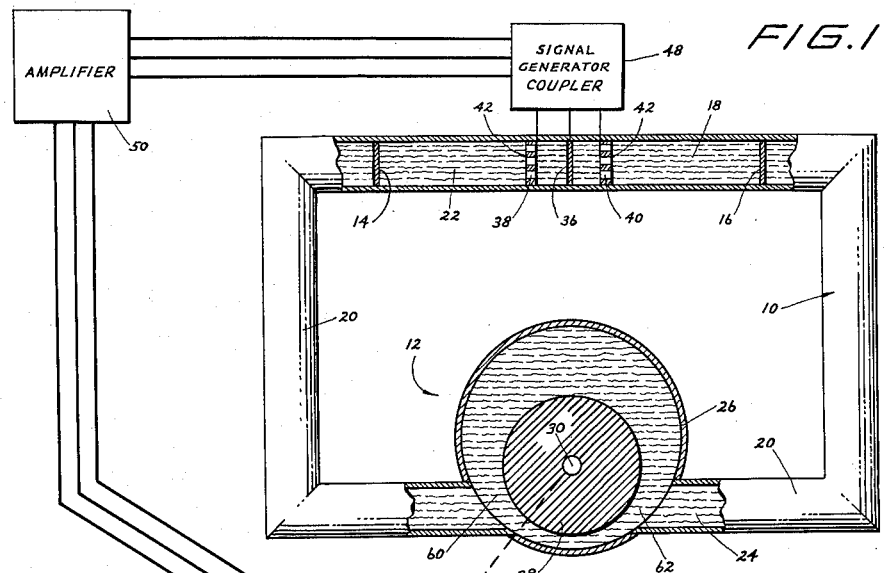
FIG.1
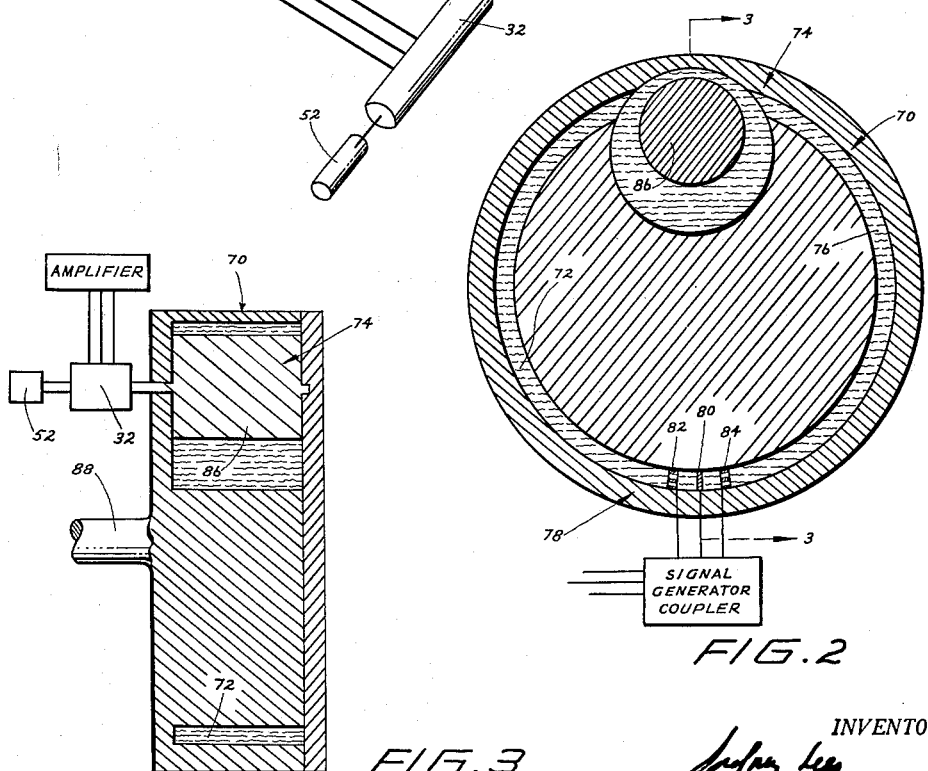
FIG.2
FIG.3
INVENTOR.

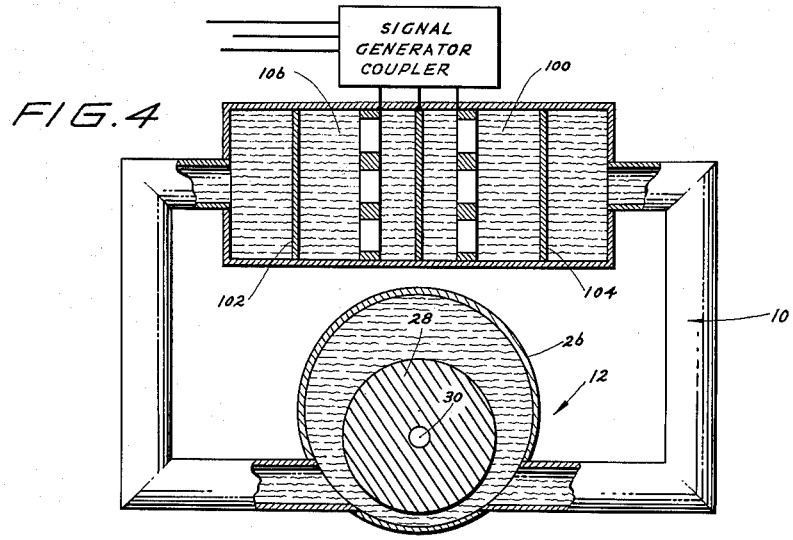
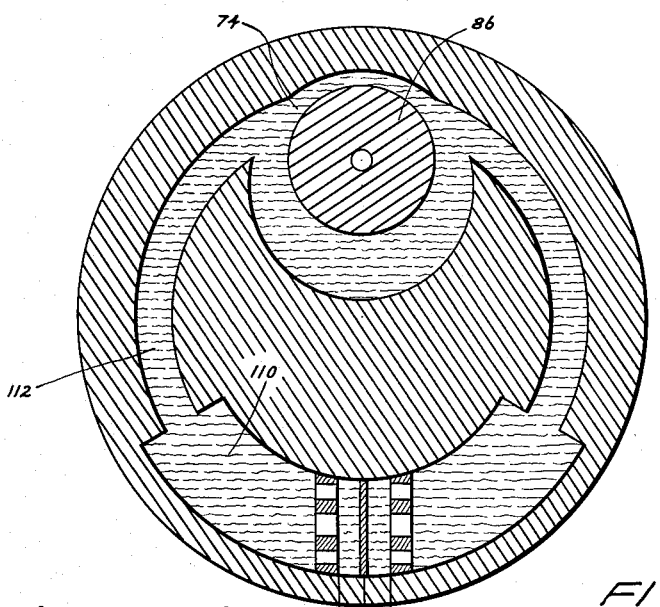
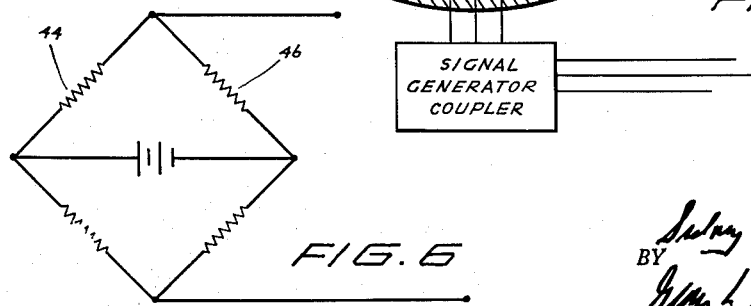

United States Patent Office 2,975,641
Patented Mar. 21, 1961

2,975,641

INTEGRATING ACCELEROMETER WITH VISCOUS DRAG PUMP

Sidney Lees, 544 Walnut St., Newton, Mass.

Filed Dec. 15, 1958, Ser. No. 780,566

14 Claims. (Cl. 73—503)

This invention relates to acceleration measuring devices and more particularly comprises an improvement over the integrating linear and angular accelerometers disclosed in my copending applications Serial Nos. 655,035 and 710,660 filed April 25, 1957 and January 23, 1958, respectively. This invention also is a modification of the invention disclosed in my copending application Serial No. 763,623 filed September 26, 1958.

In my copending applications Serial Nos. 655,035 and 710,660, I disclose integrating accelerometers which employ liquids as the seismic element. The accelerometers are in the form of closed fluid systems formed by a continuous passage. The fluids that fill the passages are Newtonian liquids and displace in the system in response to movement of the instrument. A signal generator built into an enlarged portion of the passage in each instrument measures the displacement of the liquid, and the measured displacement is proportional to the change in velocity of the instrument. The integration performed by each instrument to render a measurement of the instantaneous change in velocity is the result of the relationship between the cross-sectional areas of the portion of the passage containing the signal generator and the remaining portion of the passage, and the viscosity of the Newtonian liquids. This feature is demonstrated mathematically in each of the applications.

The direct reading instruments described above are satisfactory for many applications, but those skilled in the art are aware that a null-type system has many additional advantages. For example, diaphragms which extend across the continuous passage of the integrating linear accelerometer disclosed in application Serial No. 655,035 exert some restraint against liquid displacement. It is necessary in the direct reading instrument to make the diaphragms of thin and flexible material to minimize the restraint. In a null-type system, the displacement of the diaphragms is limited by applying counter pressures, and the effects of the elastic restraint is minimized.

Another disadvantage of the earlier devices is the necessity to limit the displacement of the diaphragms and, therefore, to limit the range of the velocity that can be measured. The limitation of range may be expressed as the ratio of the maximum velocity that can be measured to the minimum velocity that can be detected. In a null-type system the minimum velocity that can be measured is limited only by the capabilities of the indicating system so that the ratio of the maximum to minimum measurable velocity is effectively infinite, but is quite finite for the direct reading instrument. Thus, two important advantages of null-type instruments are their increased accuracy and range.

The primary object of my invention is to reduce to a minimum amount the displacement of the sensing element in an integrating accelerometer.

Another object of my invention is to increase the accuracy and range of indicated quantity of an integrating accelerometer.

Still another important object of my invention is to provide instruments which may measure the first, second or third integral of linear and angular accelerations.

To accomplish the several objects of my invention, in each embodiment I employ a closed and continuous fluid path defined by an endless passage formed within a case. In the embodiment of my invention capable of measuring changes in linear velocity, a pair of spaced diaphragms extend across the passage and divide the closed, continuous path into two non-communicating compartments. The compartments contain Newtonian liquids of different density. Unlike all of my earlier integrating accelerometers disclosed in the applications identified above, the embodiment of this invention does not depend only upon a capillary tube-signal generator area relationship to render a measurement of instantaneous changes in velocity. That is, the integration does not depend solely upon a restricted passage interconnecting the ends of the large compartment housing the signal generator. Rather, the invention includes a viscous drag pump which interrupts one of the compartments and the viscous action of the pump in its normal operation performs an integration.

In the embodiment of my invention capable of measuring changes in angular velocity, the passage is not subdivided into several distinct compartments containing different Newtonian liquids. Rather, the passage is filled throughout with but one such liquid. As in the preceding embodiment, a viscous drap pump interrupts the passage and in its normal operation performs the integrating function.

In each embodiment of my invention a sensing device is disposed within the passage and displaces with the liquid. The sensing device may take any form such as a flexible diaphragm secured to the walls of the passage, or a float submerged in and having a density equal to that of the fluid. The sensing device forms part of a signal generator for producing a signal proportional to the displacement of the liquid.

The viscous drag pump disposed in the passage is driven by a motor which in turn is controlled and actuated by the output signal of the signal generator. As will be explained in the detailed description, the viscous drag pump is caused to create a pressure in the passage which is equal and opposite to the pressure applied to the fluid in the passage resulting from the acceleration of the instrument case. The viscous drag pump includes a cylindrical case within which is a rotor whose axis is displaced from the cylinder axis. The sides of the rotor engage the walls of the case while its periphery is spaced from the case walls. Therefore, the liquid in the case is free to circulate about the rotor but cannot leak about its sides. The rotor rotates about its own axis and its angular displacement is a measure of the instantaneous change in velocity.

In other illustrated embodiments of my invention, a second integration is introduced by including a capillary tube as part of the continuous fluid path. Thus, the integration performed by the viscous drag pump and the integration performed by the capillary tube cause the instruments to render a read out proportional to the second integral of acceleration, whether the acceleration be linear or angular.

These and other objects and features of my invention along with its many advantages will be better understood and appreciated from the following detailed description of several embodiments thereof, selected for purposes of illustration and shown in the accompanying drawing in which:

Figure 1 is a diagrammatic view partly in section of an integrating linear accelerometer constructed in accordance with my invention;

Figure 2 is a diagrammatic view partly in section of an integrating angular accelerometer constructed in accordance with my invention;

Figure 3 is a cross sectional view taken along the corresponding section line of Figure 2;

Figure 4 is a diagrammatic view partly in section of another embodiment of an integrating linear accelerometer;

Figure 5 is a diagrammatic view in cross section of another embodiment of an integrating angular accelerometer; and Figure 6 is a schematic diagram of a sensing circuit which may be used in each of the instruments.

The embodiment of my invention illustrated in Figure 1 includes in its general organization a duct or passage 10 having its ends connected to a viscous drag pump 12. The pump 12 comprises a nulling subsystem for the accelerometer and forms with the passage an endless fluid path. The passage 10 which may have any cross sectional shape may be uniform throughout its length. A pair of thin and flexible diaphragms 14 and 16 etxend across the duct 10 at different points and divide the duct into two unconnected liquid compartments 18 and 20.

The compartment 18 is filled with a Newtonian liquid 22 while the compartment 20 is filled with a second Newtonian liquid 24 of different density. The second Newtonian liquid also fills the chamber of the viscous drag pump. Those skilled in the art will recognize that if the duct 10 is moved to the right as shown in the drawing and is subjected to an acceleration in that direction, the liquids 22 and 24 will displace in the duct 10 and the viscous drag pump 12. The direction of displacement is determined by the relative densities of the liquids and the direction of the acceleration. That is, if the liquid 22 has a greater density than the liquid 24, the liquid 22 will move generally to the left in a direction opposite to that of the acceleration of the instrument (in this example, to the right) while the lighter liquid 24 will move to the right.

The viscous drag pump 12 includes a cylindrical shell 26 within which is mounted a rotor 28. The axis 30 of the rotor 28 is displaced from the axis of the cylindrical shell and the rotor rotates about its own axis in the eccentric position illustrated. Rotation is imparted to the rotor 28 by the bi-directional variable speed motor 32 illustrated diagrammatically. The periphery of the rotor 28 is spaced from the cylindrical wall of the shell or case 26, and the side flat walls of the rotor engage the flat walls of the shell. This arrangement is illustrated in Figure 3 in connection with another embodiment of my invention. The position of the rotor confines the movement of the liquid in the pump to the annular space about the rotor within the shell and no leakage may occur about the sides of the rotor.

I have suggested in the introduction that the motor 32 is driven by a signal generator which responds to the displacement of the liquid in the duct. The signal generator includes a flexible diaphragm 36 disposed in the compartment 18. The diaphragm 36 is thin and flexible so that it displaces with the liquid 22 in that compartment. A pair of perforated plates 38 and 40 are disposed one on each side of the diaphragm 36. Unlike the diaphragm 36, the plates 38 and 40 are rigid and do not displace with the liquid 22. The perforations 42 which cover the plates allow the liquid 22 to displace in its chamber with minimum resistance. If the liquid 22 is electrically conductive, the diaphragm 36 and the plates 38 and 40 may be connected to form the bridge circuit shown in Figure 6 and an electrical signal may be produced proportional to the displacement of the liquid. Thus, the liquid between the plate 38 and the diaphragm 36 may form the resistor 44 in the bridge circuit of Figure 6 while the liquid between the diaphragm 36 and the plate 40 may form the second resistor 46 in the bridge. The signal generator coupler box 48 shown in Figure 1 represents the other components in the signaling device.

It will be noted in Figure 1 that the output of the signal generator is connected to an amplifier 50 which in turn sends an amplified signal to the motor 32. A rotations counter 52 connected to the motor 32 records the rotations of the motor and more particularly the rotor 28 of the pump. The rotations counter 52 may be replaced by any of several well known devices which produce a signal that corresponds to angular rotation in either digital or analog values.

The viscous drag pump 12 is employed in the system to null the displacement of the liquids. The manner in which the viscous drag pump accomplishes this purpose is demonstrated in the following paragraphs.

The pump consists generally of two cylinders, the smaller one serving as a rotor within the larger cylinder which comprises the case. The smaller cylinder or rotor rotates about its own axis which is displaced from the axis of the case. From the theory of full journal bearings with no side leakage (as explained in "Lubrication," by Arthur E. Norton, McGraw Hill Book Co., 1952, chapter VII), the pressure distribution around the inner cylinder is given by the expression $$(1) \quad P - P_0 = \left[\frac{\mu 2\pi r_{1c}^2}{c^2} P_f\right] \frac{dA_{1c}}{dt}$$

Where $P$ = pressure at any point on the periphery of the inner cylinder;
$P_0$ = a reference pressure;
$\mu$ = the viscosity of the liquid;
$P_f$ = the pressure factor that is a function of the angular displacement from a reference point on the inner cylinder;
$c$ = the distance between the axes of the two cylinders;
$r_{1c}$ = the radius of the inner cylinder; and $\frac{dA_{1c}}{dt}$ = the angular velocity of the inner cylinder.

In a viscous drag pump, the axes of the cylinders are maintained in a fixed relationship, and, therefore, the locations of maximum and minimum pressure can be determined. When the direction of rotation of the inner cylinder is reversed, the maximum and minimum pressure points reverse at the same fixed locations. By connecting the ends of the duct 10 to these points of extreme pressures, or by connecting the ends to other points of different pressure, the pressures causing displacement of the liquid may be balanced. Since the pressure factor, $P_f$ is solely controlled by the geometry of the pump structure, the pressure difference that exists between the two points about the inner cylinder of the pump may be expressed as follows:

$$(2) \quad \Delta P_{vdp} = S_{vdp} \frac{dA_{1c}}{dt}$$

Where $S_{vdp}$ = the sensitivity of the viscous drag pump and is determined solely by the geometry of the structure and the viscosity of the liquid.

Thus, as is evident in Equation 2, a pressure difference may be generated between two points which is proportional to the angular velocity of the pump rotor. Because the pressure difference at the two pressure points is determined by the velocity of the viscous drag pump rotor, by driving the motor 32 at a speed proportional to the magnitude of the signal produced by the signal generator, the pressure difference between the points may be made to equal the pressure of the displaced liquid. This is precisely the arrangement used in the embodiment shown in Figure 1 wherein the signal generator 48 produces a signal proportional to the displacement of the Newtonian liquid 22 and that signal in turn drives the motor 32 at an angular velocity proportional to the magnitude of the signal. In Figure 1 the ends of the duct 10 are connected at the approximate locations of maximum and minimum pressure. If the rotor 28 is turned in a counter clockwise direction as viewed in that figure, the higher pressure will occur approximately at the location of point 60 while the lower pressure within the shell will exist approximately at point 62. When the direction of rotation of the rotor is reversed, the locations of higher and lower pressures will reverse. Thus, the direction of displacement of the liquid 22 must determine the direction of rotation of the rotor.

Having demonstrated mathematically that the angular velocity of the viscous drag pump rotor is proportional to the pressure difference at the points 60 and 62 within the shell of the pump, I will now present an analysis of the integrating accelerometer in Figure 1 to demonstrate that the displacement of the rotor is proportional to the change in velocity of the instrument.

The sources of pressure drops around the closed two fluid system, excluding the pressure drop created by the viscous drag pump, are the inertial reaction pressure, the viscous damping pressure, and the elastic restraint pressure. The inertial reaction pressure may be expressed mathematically as follows:

$$(3) \quad \Delta P_{ir} = \frac{-m_{eff}}{A_{sg}} \frac{d^2 x_{og}}{dt^2} - \Delta\rho L_{eff} \frac{d^2 x_{[I-ca]}}{dt^2}$$

Where
$P_{ir}$=the pressure drop due to inertial reaction;
$m_{eff}$=effective mass of the two liquid system;
$A_{sg}$=the area of the signal generator section;
$\Delta\rho$=the difference in density between the two liquids;
$L_{eff}$=the effective length of the compartment housing the signal generator;

$\frac{d^2 x_{og}}{dt^2}$=the acceleration of the signal generator with respect to the case;

$\frac{d^2 x_{[I-ca]}}{dt^2}$=the acceleration of the case with respect to inertial space.

It will be noted that the terms $m_{eff}$ and $L_{eff}$ depend on the geometry of the structure.

The viscous damping pressure may be expressed mathematically as follows:

$$(4) \quad \Delta P_{vd} = -\frac{c_{d(eff)}}{A_{sg}} \frac{dx_{sg}}{dt}$$

Where
$\Delta P_{vd}$=pressure drop due to viscous damping;
$c_{d(eff)}$=effective viscous damping coefficient;

$\frac{dx_{sg}}{dt}$=velocity of the signal generator with respect to the case; and $A_{sg}$=the cross sectional area of the signal generator.

The effective viscous damping coefficient $c_{d(eff)}$ is proportional to the viscosity of the Newtonian liquids and the ratio of the square of the signal generator cross sectional area to the square of the cross sectional area of the passage which interconnects the ends of the signal generator compartment and to other geometric factors. This relationship has been established mathematically in my copending application Serial No. 655,035. In the invention disclosed in that application, the signal generator was housed in a compartment which had an appreciably larger cross sectional area than the cross sectional area of the rest of the passage. However, in the embodiment of my invention shown in Figure 1, the cross sectional areas of the diaphragm 36 and the compartment 20 are shown as identical and therefore the ratio of the squares of their cross sectional areas is equal to unity. Thus, for the arrangement shown in Figure 1, the effective viscous damping coefficient is controlled by the viscosity of the Newtonian liquids and the other factors implicit in the definition of this quantity.

The elastic restraint pressure is expressed mathematically as follows:

$$(5) \quad \Delta P_{er} = -\frac{k_{er(eff)} X_{sg}}{A_{sg}}$$

Where
$\Delta P_{er}$=pressure drop due to the residual elastic restraints (such as the diaphragms);
$k_{er}$=elastic restraint coefficient; and
$X_{sg}$=displacement of the signal generator with respect to the case.

Earlier, I have demonstrated that the viscous drag pump inner cylinder or rotor may be caused to rotate at a rate proportional to the displacement of the signal generator by the action of the connecting amplifier and motor. Ignoring the dynamic characteristics of the components, the pressure drop in the system due to the viscous drag pump in the steady state may be expressed as follows:

$$(6) \quad \Delta P_{vdp} = -S_{vdp} \frac{dA_{ic}}{dt}$$

This equation is substantially identical to Equation 2 above. The negative sign introduced into the equation indicates that the pressure drop generated by the pump opposes the motion of the signal generator.

Having defined the several pressures acting in the system, it will be appreciated that the pressure summation equation about the entire system including the pump may be written as follows:

$$(7) \quad \Delta P_{ir} + \Delta P_{rd} + \Delta P_{er} + \Delta P_{rdp} = 0$$

or $$(8) \quad m_{eff}\frac{d^2 x_{sg}}{dt^2} + c_{d(eff)}\frac{dx_{sg}}{dt} + k_{er(eff)} x_{sg} + S_{vdp} A_{sg} \frac{dA_{ic}}{dt}$$

$$= -\Delta\rho L_{eff} A_{sg} \frac{d^2 x_{[I-ca]}}{dt^2}$$

The angular velocity of the viscous drag pump inner cylinder is related to the displacement of the signal generator as follows:

$$(9) \quad \frac{dA_{ic}}{dt} \geq S_m S_a x_{sg}$$

Where
$S_m$=the motor sensitivity; and
$S_a$=amplifier sensitivity.

By combining Equations 8 and 9 we obtain (10)

$$m_{eff}\frac{d^3 A_{ic}}{dt^3} + c_{d(eff)}\frac{d^2 A_{ic}}{dt^2} + (k_{er(eff)} + S_{vdp} S_m S_a A_{sg})\frac{dA_{ic}}{dt}$$

$$= -\Delta\rho L_{eff} A_{sg} S_m S_a \frac{d^2 x_{[I-ca]}}{dt^2}$$

When $$m_{eff}\frac{d^3 A_{ic}}{dt^3} \text{ and } c_{d(eff)}\frac{d^2 A_{ic}}{dt^2}$$

are made effectively unimportant as compared to the other factors in Equation 10 by appropriate design, that equation may be rewritten as follows:

$$(11) \quad A_{ic} = S_1 \int \frac{d^2 x_{[I-ca]}}{dt^2} dt$$

Where $$(12) \quad S_1 = \frac{-\Delta\rho L_{eff} A_{sg} S_m S_a}{k_{er(eff)} + S_{vdp} S_m S_a A_{sg}}$$

From Equation 11, it will now be appreciated that the displacement of the rotor of the viscous drag pump may be proportional to the integrated acceleration of the case with respect to inertial space, if the effective mass of the system and the effective viscous damping coefficient are reduced to negligible quantities by appropriate design.

Referring to Figure 1, the reader will observe that the effective viscous damping coefficient is in fact reduced to a negligible quantity by maintaining the cross sectional area of the duct 10 substantially uniform throughout the system. In this way the effective viscous damping coefficient is proportional to and varies directly with the viscosities of the liquids. Furthermore, the effective mass of the two liquid system is relatively small as compared to the other factors in Equation 10. As a result, the rotations counter 52 which records the angular displacement of the rotor 28 in fact renders a reading which is directly proportional to the change in velocity of the instrument.

It should be appreciated that the proportionality between the integrated acceleration of the case and the displacement of the rotor of the viscous drag pump may be achieved in other ways. For example, if the viscous damping pressure is larger than desirable because of the lack of uniformity of the cross sectional area of the duct 10, the selection of a motor, amplifier or other component having the appropriate sensitivity may reduce or eliminate its effect. Thus, in the embodiment of Figure 1 and in the other embodiments described below, the particularly geometry employed to achieve the desired relationship between acceleration and displacement of the pump rotor may be modified. However, the various components selected must complement each other to satisfy the ultimate requirements of the operative Equation 11.

In the embodiment of Figure 2 the concept described in connection with the linear integrating accelerometer of Figure 1 is employed in an angular integrating accelerometer. In this embodiment a case 70 is provided with an endless passage 72 interrupted at one point by a viscous drag pump 74. The continuous passage 72 unlike the duct 10 of the first embodiment, does not include a pair of spaced diaphragms which divide the passage into separate compartments. Rather, the passage 72 and the viscous drag pump 74 are filled with one Newtonian liquid 76. A signal generator 78 including a thin and flexible diaphragm 80 disposed between a pair of perforated plates 82 and 84 produces a signal proportional to the displacement of the liquid in the passage 72. As in the embodiment of Figure 1, the signal generator is connected through an amplifier 50 and a motor 32 to the rotor 86 of the viscous drag pump and the rotor is caused to rotate at an angular velocity proportional to the magnitude of the signal.

In operation, the case 70 is connected to the body whose change in angular velocity is to be measured. In Figure 3 a shaft 88 is illustrated and this shaft may be employed to connect the case 70 to the body. However, it is to be understood that any sort of coupling device may be used for this purpose. When connecting the case 70 to the body, it is only necessary that the area enclosed by the endless passage 72 have a finite projected area in a plane perpendicular to the axis of rotation of the body. When the case is connected to the rotating body in the manner described, the displacement of the rotor 86 will be proportional to the change in angular velocity of the body. The rotations counter 52 or other similar device may be employed to measure the displacement of the rotor. The mathematical analysis presented in connection with the embodiment of Figure 1 is equally applicable to this embodiment. The viscous drag pump 74 serves as a nulling subsystem to counteract the pressure drops in the passage 72 caused by the inertial reaction pressure, the viscous damping pressure, and the elastic restraint pressure. By reducing the effective mass of the system and the effective viscous damping coefficient with respect to the viscous drag pump effective coefficient, the displacement of the rotor 86 is proportional to the instantaneous change in angular velocity of the body to which the case 70 is connected.

Although considerable material has been presented to demonstrate that the accelerometers shown in Figures 1 and 2 provide a readout proportional to the change in velocity of the instrument, it should be borne in mind that the primary purpose of the viscous drag pump is to null the system. The counter pressures generated by the pump null the displacement of the sensing element to achieve the objects stated in the introduction.

The embodiments of my invention shown in Figures 1 and 2 have been demonstrated as producing an output proportional to the integral of linear and angular acceleration, respectively. By only slightly modifying the embodiments of my invention shown in those figures, the instruments may be caused to provide an output which is proportional to the second integral of acceleration; that is, proportional to linear displacement in one embodiment and angular displacement in the other. Such instruments are shown in Figures 4 and 5 wherein like numbers refer to identical elements previously described.

The embodiment of my invention shown in Figure 4 is capable of producing a reading which is proportional to the second integral of linear acceleration of the instrument. This embodiment differs from that shown in Figure 1 in that the compartment which houses the signal generator, and more particularly the diaphragm and the plates, has a cross section which is substantially larger than that of the remaining portion of the duct. That compartment 100 housing the generator has a pair of diaphragms 102 and 104 which extend across its ends and separate the portion 106 from the remaining portion of the duct. As in the embodiment of Figure 1, the signal from the signal generator through an amplifier and motor (not shown) drives the rotor 28 of the viscous drag pump 12.

The reader will recall that in the embodiment of Figure 1 the effective viscous damping coefficient was made unimportant as compared to other of the terms in Equation 10 and therefore was considered in effect a negligible quantity. This was accomplished by reducing the ratio of the squares of the cross sectional areas of the two compartments to a small value (unity in the embodiment of Figure 1). However, as was pointed out in the description of that embodiment, the relationship could be achieved with other geometry.

In the embodiment of Figure 4, the ratio of the squares of the cross sectional areas of the chamber 106 and the passage 10 are such that the effective viscous damping coefficient is a relatively large quantity. As a result, this quantity is no longer negligible and must be considered in Equation 10. It may also be noted that good design practices suggest that the quantity $k_{er(eff)}$, the effective elastic restraint of the diaphragms be made as small as possible, although this is not necessary for operation of the instrument. When the effective elastic restraint is made small, $$(13) \qquad S_1 \rightarrow -\frac{\Delta_\rho L_{eff}}{S_{vdp}}$$

When the expressions $$m_{eff}\frac{d^3 A_{lc}}{dt^3}$$

and $$(k_{er(eff)} + S_{vdp} S_m S_a A_{sz})\frac{dA_{lc}}{dt}$$

are made small enough by appropriate design, Equation 10 may then be rewritten as follows:

$$(14) \qquad A_{lo} = S_2 \int_0^t \int_0^t \frac{d^2 x_{[I-cs]}}{dt^2} dt$$

Where $$(15) \quad S_2 = -\frac{\Delta\rho L_{\text{eff}} A_{\text{sg}} S_m S_a}{c_{d(\text{eff})}}$$

Equation 14 clearly indicates that the displacement of the rotor in the embodiment shown in Figure 4 is proportional to the second integral of the acceleration of the case with respect to inertial space. Thus, as has been indicated, a rotations counter connected to the rotor 28 of the viscous drag pump 12 in the embodiment of Figure 4 will render a reading proportional to the linear displacement of the instrument.

In Figure 5, I have shown an instrument capable of rendering a reading proportional to the second integral of the angular acceleration of a body to which it is attached. In this embodiment, all of the features contained in the embodiment of Figure 2 are employed, and in addition, the passage is enlarged at the location of the signal generator. Thus, as in the embodiment of Figure 4, a large viscous damping coefficient is created. As a result, the rotation of the rotor 86 of the viscous drag pump 74 is proportional to the second integral of the angular acceleration of the instrument. The mathematical analysis presented in connected with Figure 4 also applies to this arrangement. The relative cross sectional areas of the compartment 110 and the passage 112 are such that the viscous damping coefficient is large.

From the foregoing, it may also be appreciated that an instrument constructed in accordance with my invention may be made to render a reading which is proportional to the third integral of the acceleration of the case with respect to inertial space. This may be carried out with either a linear or an angular accelerometer. To accomplish this purpose, the quantities $$c_{d(\text{eff})} \frac{d^2 A_{ic}}{dt^2}$$

and $$(k_{\text{er(eff)}} + S_{\text{vdp}} S_m S_a A_{\text{sg}}) \frac{dA_{ic}}{dt}$$

are made small by appropriate design, and Equation 10 may be rewritten as follows:

$$(16) \quad A_{ic} = S_3 \int_0^t \int_0^t \int_0^t \frac{d^2 x_{\text{[I-ca]}}}{dt^2} dt$$

Where $$(17) \quad S_3 = -\frac{\Delta\rho L_{\text{eff}} A_{\text{sg}} S_m S_a}{m_{\text{eff}}}$$

Equation 16 demonstrates that the displacement of the rotor of the viscous drag pump is proportional to the third integral of the acceleration of the case with respect to inertial space.

Appropriate design in each of the embodiments disclosed entails a choice of geometry, a choice of the two Newtonian liquids employed, a choice of operating range, and a choice of the operating time. These factors depend upon the specific application of the instrument and as design features do not per se comprise the invention.

With the teachings contained herewith, those skilled in the art will recognize that many modifications may be made of each embodiment of my invention without departing from the basic invention disclosed. Therefore, it is not my intention to limit the breadth of this invention to the specifically illustrated embodiments, but rather, I intend that the breadth of this invention be determined by the appended claims and their equivalents.

What I claim as new and desire to secure by Letters Patent of the United States is:

1. An accelerometer comprising an endless fluid passage, Newtonian liquid filling the passage, a signal generator responsive to the displacement of the liquid for producing a signal proportional to the displacement, and a viscous drag pump disposed in the passage and responsive to the signal produced by the generator for returning the liquid in the passage to a reference position.

2. A device as defined in claim 1 further characterized by a pair of diaphragms extending across the passage and dividing the passage into two compartments, the Newtonian liquid contained in each compartment having a different density.

3. A device as defined in claim 2 further characterized by one of the compartments having a cross section substantially larger than the other, said signal generator being disposed in the compartment with the larger cross section.

4. A device as defined in claim 1 further characterized by the Newtonian liquid having a uniform density throughout the passage.

5. A device as defined in claim 1 further characterized by the passage having a portion of larger cross sectional area than the remaining portion of the passage, and with the signal generator being disposed in the portion of the passage with the larger cross section.

6. In combination with a passage filled with a Newtonian liquid, a viscous drag pump having a casing filled with the Newtonian liquid and interconnecting the ends of the passage, a rotor mounted for rotation in the casing and capable of producing unequal pressures at the points of connection of the ends of the passage with the casing, means disposed in the passage for producing a signal proportional to the displacement of the liquid, means responsive to the signal and connected to the rotor causing the rotor to rotate at a speed proportional to the magnitude of the signal, and indicating means sensitive to the displacement of the rotor.

7. An accelerometer comprising a cylindrical case, an axially rotatable rotor mounted in the case with its axis displaced from the axis of the case and with the periphery of the rotor spaced from the cylindrical case, a duct having its ends connected to the case and forming with it an endless passage, liquid filling the passage, the ends of the duct being connected to high and low pressure areas in the case, a signal generator disposed in the duct and producing a signal proportional to the displacement of the liquid in the duct, a bi-directional variable speed motor for turning the rotor, an electrical circuit interconnecting the motor and the signal generator causing the motor to drive the rotor at a speed proportional to the magnitude of the signal, and means for recording the rotation of the rotor.

8. An integrating linear accelerometer comprising a duct of substantially uniform cross section, a viscous drag pump having an inlet, an outlet, and a rotor with said rotor producing a pressure differential between the inlet and the outlet proportional to the speed of rotation of the rotor, the ends of the duct being connected to said inlet and outlet and forming with the pump an endless passage, a pair of diaphragms extending across different parts of the duct and dividing the passage into two separate compartments, liquids of different density filling the two compartments, a signal generator disposed in one of the compartments and producing a signal proportional to the displacement of the liquid in that compartment, a variable speed motor for driving the rotor, an electrical circuit connecting the motor and generator causing the motor to drive the rotor at a speed proportional to the magnitude of the signal, and recording means sensitive to the rotation of the motor.

9. An integrating angular accelerometer comprising a duct of substantially uniform cross section, a viscous drag pump having an inlet, an outlet, and a rotor with said rotor producing a pressure differential between the inlet and the outlet proportional to the speed of rotation of the rotor, the ends of the duct being connected to said inlet and outlet and forming with the pump an endless passage, a liquid filling the passage, a signal generator disposed in the duct and producing a signal proportional to the displacement of the liquid in the duct, a variable speed motor for driving the rotor, an electrical circuit connecting the motor and the generator causing the motor to drive the rotor at a speed proportional to the magnitude of the signal, and recording means sensitive to the rotation of the rotor.

10. An integrating linear accelerometer comprising a duct, a viscous drag pump having an inlet, an outlet, and a rotor with said rotor producing a pressure differential between the inlet and the outlet proportional to the speed of rotation of the rotor, the ends of the duct being connected to said inlet and outlet and forming with the pump an endless passage, a pair of diaphragms extending across the different parts of the duct and dividing the passage into two separate compartments, one of said compartments having a substantially greater cross section than the other, liquids of different density filling the two compartments, a signal generator disposed in the compartment of greater cross section and producing a signal proportional to the displacement of the liquid in that compartment, a variable speed motor for driving the rotor, an electrical circuit connecting the motor and generator causing the motor to drive the rotor at a speed proportional to the magnitude of the signal, and recording means sensitive to the rotation of the rotor.

11. An integrating angular accelerometer comprising a duct, a viscous drag pump having an inlet, an outlet, and a rotor with said rotor producing a pressure differential between the inlet and outlet proportional to the speed of rotation of the rotor, the ends of the duct being connected to said inlet and outlet and forming with the pump an endless passage, a chamber formed as part of the passage and having a cross sectional area substantially greater than the remaining portion of the passage, a Newtonian liquid filling the passage, a signal generator disposed in the chamber and producing a signal proportional to the displacement of the liquid in the chamber, a variable speed motor for driving the rotor, an electrical circuit connecting the motor and generator causing the motor to drive the rotor at a speed proportional to the magnitude of the signal, and recording means sensitive to the rotation of the rotor.

12. An accelerometer comprising an endless fluid passage, Newtonian liquid filling the passage, a signal generator responsive to the displacement of the liquid for producing a signal proportional to the displacement, a viscous drag pump disposed in the passage and responsive to the signal produced by the generator for returning the liquid in the chamber to a reference position, and means operatively associated with the viscous drag pump for measuring the change in velocity of the passage in space.

13. An accelerometer comprising an endless fluid passage, Newtonian liquid filling the passage, a signal generator responsive to the displacement of the liquid for producing a signal which is a function of the displacement of the liquid in the passage, a viscous drag pump disposed in the passage and responsive to the signal produced by the generator for returning the liquid in the passage to a reference position, and means responsive to the operation of the pump for measuring the change in velocity of the passage in space.

14. A device as defined in claim 2 further characterized by said passage having a projected area in a plane parallel to the direction of the acceleration to be measured, and means responsive to movement of the viscous drag pump for measuring the change in velocity of the passage in space.

References Cited in the file of this patent

UNITED STATES PATENTS

| 2,225,716 | Sexton | Dec. 24, 1940 |
| 2,842,961 | Doll | July 15, 1958 |

FOREIGN PATENTS

| 20,676 | Great Britain | Sept. 14, 1914 |